March 31, 1959  F. E. BROWN  2,879,666
IMMERSION THERMOMETER
Filed Dec. 14, 1953  2 Sheets-Sheet 1

INVENTOR.
FRANK E. BROWN,
By His Attorneys.
HARRIS, KIECH, FOSTER & HARRIS.

March 31, 1959  F. E. BROWN  2,879,666
IMMERSION THERMOMETER
Filed Dec. 14, 1953  2 Sheets-Sheet 2

INVENTOR.
FRANK E. BROWN,
By His Attorneys.
HARRIS, KIECH, FOSTER & HARRIS.

United States Patent Office 2,879,666
Patented Mar. 31, 1959

2,879,666

IMMERSION THERMOMETER

Frank E. Brown, Burbank, Calif., assignor to Frederick M. Turnbull, Los Angeles, Calif.

Application December 14, 1953, Serial No. 397,820

9 Claims. (Cl. 73—374)

This invention relates to a thermometer and, more particularly, to a thermometer adapted to be immersed in a large body of liquid and which is so constructed that it will temporarily preserve the temperature reading obtained in one portion of the body of liquid during its transit through the main body of the liquid as it is withdrawn therefrom.

A wide variety of thermometers designed to be immersed in large bodies of liquid to determine the temperature of particular portions of said bodies is to be found in the prior art but such thermometers have, in general, been characterized by two major inadequacies. In the first place, prior art thermometers have usually been exceedingly fragile and since they are subjected to hard usage the over-all useful life thereof has been relatively short. In the second place, difficulties have been encountered in the use of prior art thermometers due to the fact that while they were designed to permit a temperature reading to be taken and to be retained during the transit of the thermometer through the body of liquid, a portion of which has had its temperature measured, nevertheless it has been found quite difficult to be sure that temperature variations from the originally recorded temperature will not occur due to the transit of the thermometer through the greater part of the large body of liquid in which it has been immersed and also due to flash evaporation of the liquid upon the external surface of the thermometer when it is exposed to the ambient air.

It is an object of my invention to provide an immersion-type thermometer which, while it is characterized by sensitivity to ambient temperatures, is nevertheless extremely strong and designed to resist shock loads imposed thereupon by inadvertent contact with adjacent surfaces or the bottoms or tops of tanks or other receptacles.

Some difficulty has been encountered in prior art thermometers because of the utilization of mechanical shock absorption means only, such as springs, or the embodiment in the thermometers of rubber pads or other expedients designed to isolate certain component portions of the thermometer from shock loads to which the thermometers are inevitably subjected. However, prolonged usage of such thermometers has demonstrated the inadequacies of conventional structures embodying such expedients and the high temperatures to which immersion-type thermometers are frequently subjected materially reduce the effective life of conventional shock isolating expedients.

Another object of my invention is the provision of an immersion-type thermometer which is constituted by an external housing which is provided with a receptacle within the interior thereof in which is disposed an external cell formed from translucent material and having mounted in the interior thereof an elongated bulb-type thermometer. Provided in the interior of the cell is an elongated supporting member for the thermometer which is formed integrally with the interior wall of the cell and which is adapted to be laterally deflected when shock loads are imposed upon the housing to isolate the elongated thermometer mounted therein from said shock loads and to prevent the breaking of said elongated thermometer or the supporting member therefor.

An additional object of my invention is the provision of an immersion-type thermometer which is characterized by sensitivity to ambient temperatures but which is nevertheless capable of maintaining at a constant level a temperature reading which has been made. This desirable end is achieved by the utilization in the aforementioned cell of the thermometer of a cell liquid having a high heat content, such as, for example, propylene glycol, which thus acts as a iquid buffer to prevent the loss of a temperature reading on the bulb-type thermometer located in the supporting member of the thermometer when the thermometer is translated through a large body of liquid from a point at which the temperareading has been taken.

Another object of my invention is the provision of an immersion-type thermometer which includes an elongated, tubular supporting member formed integrally with the external cell disposed in the housing of the thermometer, said tubular member being designed to receive an elongated bulb-type thermometer and being provided with means for circulating the aforementioned cell liquid over the periphery of the bulb-type thermometer to insure the rapid transmittal to said thermometer of the heat content of an ambient liquid external to said cell.

Another object of my invention is the provision in an immersion-type thermometer of an external cell formed of glass, the interior wall of said cell having formed upon one end thereof an elongated tubular member constituting a support for a bulb-type thermometer located therein in spaced relation with the interior wall thereof. In order to prevent undue lateral deflection of the tubular member with respect to the interior wall of the cell, buffer means are provided on the lowermost end thereof adapted to engage the interior wall of said cell when lateral deflection of the tubular member occurs.

A further object of my invention is the provision of an immersion-type thermometer of the aforementioned character in which the cell liquid is sealed in the cell and is somewhat less than sufficient to entirely fill the interior of the cell so that when the thermometer is immersed in a body of liquid at elevated temperatures, expansion of the cell liquid will be permitted. Therefore, in this manner I prevent undue expansion of the cell liquid, which expansion might cause rupture of the cell wall.

Another object of my invention is the provision of a method of fabricating an immersion-type thermometer of the character discussed previously which insures that an adequate but not excessive amount of fluid will be incorporated in the interior of the cell prior to the sealing thereof.

To accomplish this desired end, I fabricate the cell of the thermometer together with the elongated supporting member and the bulb-type thermometer disposed in the interior thereof, leaving only one end of the cell open. I then partially fill the cell of the thermometer, in a manner which will be described in greater detail, and subsequently subject the partially filled cell to heat in order to cause the expansion of the cell fluid. After the cell fluid has expanded, I then seal the open end of the cell with the fluid in the expanded state. The manifest and numerous advantages derived from the practice of the method of my invention will be adverted to herebelow in greater detail.

Other objects and advantages of my invention will be apparent from the following specification and the accompanying drawings which are for the purpose of illustration only and in which.

Figure 1:
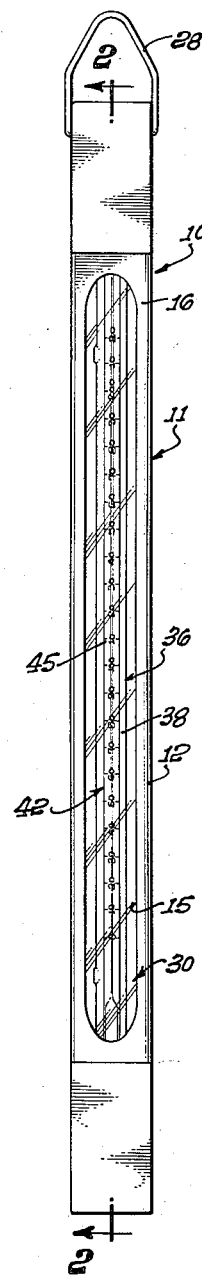
Fig. 1 is a front elevational view of an immersion-type thermometer constructed in accordance with my invention.

Referring to the drawings and particularly to Fig. 1 thereof, I show an immersion-type thermometer 10 constructed in accordance with my invention and generally constituted by an elongated housing 11 formed of wood or similar material and including a main, elongated, hollow body member 12, said body member 12 being provided with an elongated opening 15 in a wall 16 thereof which communicates with a receptacle 17 in the interior of the body member 12. The upper and lower ends of the hollow body member 12 are closed by means of rectangular wood plugs 22 and 24 which are retained in operative relation with the body member 12 by means of pegs 25 and 27, respectively. A bail 28 is secured to the upper end of the housing 11 and permits the housing to be suspended in a tank or other vessel for determining the temperature of the liquid contents thereof.

Disposed in the receptacle 17 in the interior of the body member 12 is an elongated, hollow cell 30 formed from a heat-resistant glass and being generally of substantially cylindrical cross-sectional configuration. Although I have described the cell 30 as being formed of heat-resistant glass so that when the cell is disposed in the receptacle 17 and the peripheral wall thereof juxtaposed to the opening 15 in the wall 16 of the housing 11 a viewer may look through said wall, it is conceivable that a cell might be provided which is not formed entirely of glass but which is merely provided with a transparent wall formed of glass or a substitute material of substantially equal transparency.

The upper end of the cell 30 is substantially flat and abuts securely on the under side of the plug 22 in the upper end of the hollow body member 12, while the lower end thereof has formed thereupon and integrally therewith a depending boss 33 which is seated in a spring 34 mounted in a recess 35 in the upper end of the plug 24. Therefore, the spring 34, through its engagement with the lower end of the cell 30 and, more particularly, the depending boss 33 formed integrally therewith serves to urge the cell 30 bodily upward in the receptacle 17 to maintain the uppermost end thereof in uniform contact with the under side of the upper block 22. In this manner, the cell 30 is restrained against free vertical movement within the receptacle 17 but is nevertheless permitted relatively slight vertical movement if vertical shock loads are imposed thereupon to prevent the shattering or cracking of the cell 30.

When installing the cell 30 or removing it from the housing 11, it is merely necessary to remove the bail 28 and the peg 25 from engagement with the plug 22. The plug 22 is then slipped out of the upper end of the housing 16 and the entire cell 30 can then be readily slid out of the bore of the elongated tubular body member 12 to permit the replacement thereof. When the cell 30 is being originally installed it need merely be slipped into the bore of the elongated tubular body member 12 and the depending boss 33 on the lowermost end thereof inserted in the upper end of the compression spring 34. The plug 22 is then reinserted in the upper end of the bore of the elongated tubular body member 12 and the peg 25 and bail 28 installed in operative relationship therewith. It can, therefore, be readily seen that the assembly of the cell 30 in the receptacle 17 of the housing 11 can be readily accomplished with a minimum expenditure of time and effort.

Figure 5:
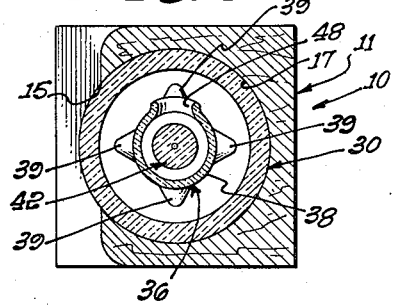
Fig. 5 is an enlarged, transverse, sectional view of the lower portion of the lower portion of the thermometer of my invention.

Disposed in the interior of the cell 30 and having its upper end formed integrally with the interior of the upper end of said cell is an elongated supporting member 36 constituted, in the present instance, by an elongated tubular member 38 formed from the same type of glass as the cell 30 and having its periphery disposed in spaced relation with the interior wall of the cell 30. The lowermost end of the elongated tubular member 38 is disposed in spaced relation with the interior of the lowermost end of the cell 30 and is provided with a plurality of integral radiating buffers 39 which extend outwardly, in a manner best shown in Figs. 2 and 5 of the drawings, and have their outermost ends disposed in close proximity to but in spaced relation with the interior wall of the cell 30. The function of the buffers 39 will be discussed in greater detail below.

Figure 2:
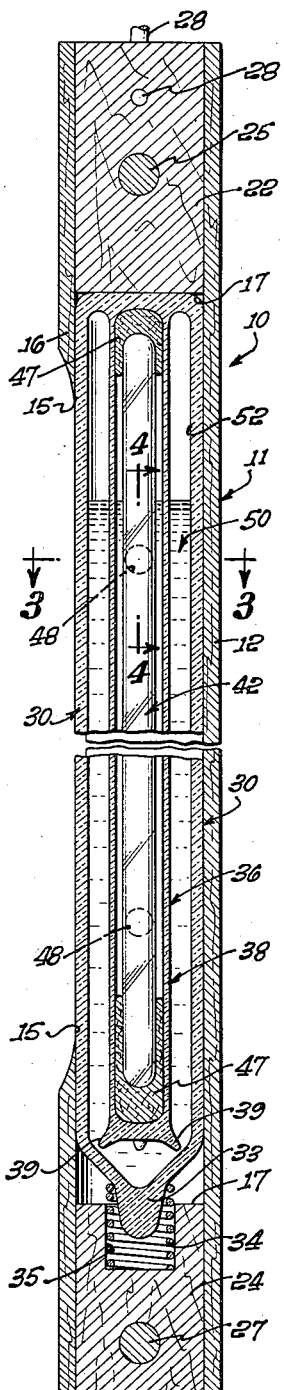
Fig. 2 is an enlarged, partly sectional view taken on the broken line 2—2 of Fig. 1.
Figure 3:
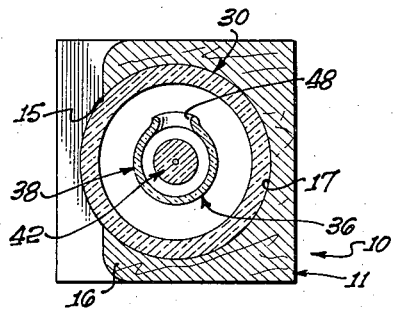
Fig. 3 is an enlarged, transverse, partly sectional view taken on the broken line 3—3 of Fig. 2.
Figure 4:
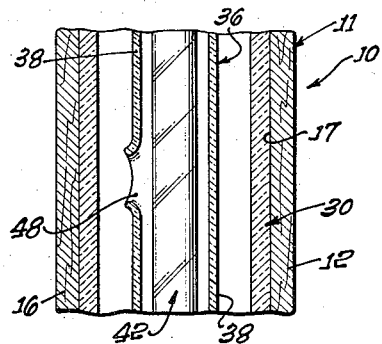
Fig. 4 is an enlarged, vertical, sectional view taken on the broken line 4—4 of Fig. 2.

Disposed in the interior of the elongated tubular member 38 and completely encompassed thereby is an elongated bulb-type thermometer 42 of conventional type whose peripheral wall is disposed in spaced relationship with the interior wall of the elongated tubular member 38 and is provided with a plurality of vertically spaced indicia thereupon, indicated generally at 45. The upper and lower ends of the bulb-type thermometer 42, as best shown in Fig. 2 of the drawings, are seated in wads 47 of glass fiber, said wads serving both to maintain the periphery of the bulb-type thermometer 42 in spaced relation with the interior wall of the elongated tubular member 38 and also to absorb shock loads imposed upon said thermometer.

The elongated tubular member 38 is provided with a plurality of vertically spaced orifices 48 adjacent the opposite ends thereof, said orifices maintaining the interior of the elongated tubular member 38 and, more particularly, the space defined between the interior wall of said elongated tubular member and the periphery of the bulb-type thermometer 42 in continual liquid communication with the interior of the cell 30 and, more particularly, with a body 50 of heat conductive and heat retaining liquid disposed in said cell 30 and retained therein by the sealing of said cell 30 in a manner to be described in greater detail below.

Although there is a large number of liquids which can be utilized to serve the heat transmitting and retention functions of the body 50 of liquid, I have found that one of the most satisfactory liquids that can be utilized is propylene glycol since it is characterized by both excellent heat transference characteristics and a high heat content, that is, it will effectively retain a maximum temperature to which it is exposed for a long period of time. It can therefore be seen that not only is the interior of the cell 30 provided with a body 50 of heat conductive liquid, but that the interior of the elongated tubular member 38 is also maintained in constant liquid communication with the body 50 of liquid in the cell 30 by means of the vertically spaced orifices 48.

It should be noted at this juncture that the body 50 of liquid sealed in the cell 30 is insufficient, when the thermometer 10 is exposed to normal ambient temperatures, to entirely fill the interior of the cell 30. However, as will be disclosed in detail below, the body 50 of liquid is expansible when subjected to high temperatures commonly encountered in large bodies of liquid and, more particularly, liquid hydrocarbons and, therefore, the space 52 above the body 50 of liquid is, as best shown in Fig. 2 of the drawings, adapted to serve the function of an expansion space and to accommodate the gradual expansion of the body 50 of liquid as it is subjected to gradually increasing temperatures.

When the thermometer 10 is actually utilized to ascertain the temperature of a body of liquid or the temperature of a portion of a large body of liquid, the housing 11 is secured to an appropriate means of suspension by attaching said means of suspension to the bail 28 thereof and the housing 11 is then immersed in the body of liquid, not shown, and lowered to the desired depth therein. When the desired depth is reached, the exterior wall of the cell 30 is exposed to the ambient liquid and the heat thereof is transmitted through the wall of the cell 30 into the body 50 of liquid in the interior of said cell. As the temperature of the body 50 of liquid in the interior of the cell 30 rises, convection currents are established therein and a continual flow takes place between the orifices 48 in the elongated tubular member 38 thus exposing the bulb-type thermometer 42 supported therein to a continual flow of heated liquid and rapidly transmitting the heat of the ambient liquid to the periphery of the bulb-type thermometer 42.

It can, therefore, be readily seen that the convection currents established in the body 50 of liquid in the interior of the cell 30 materially increase the efficiency of the thermometer 10 as a temperature detecting instrument since the instrument is rendered much more sensitive than conventional instruments by the continual exposure of the periphery of the bulb-type thermometer 42 to the flow of the heated body 50 of liquid in the interior of the cell 30. It will be noted at this juncture that as the temperature of the body 50 of liquid rises, it expands to occupy the expansion space 52 in the upper end of the cell 30. However, due to the manner in which the thermometer 10 is fabricated, as will be clearly shown below, a constant vacuum is maintained in the upper end of the cell 30, and, more particularly, the expansion space 52 so that there will be minimal resistance to the expansion of the body 50 of liquid and thus minimal strain will be imposed upon the component portions of the thermometer 10.

Another factor to be taken into consideration is that the continual circulation of the cell liquid through the openings 48 communicating with the space between the periphery of the bulb-type thermometer 42 and the interior wall of the elongated tubular member 38 serves to maintain a temperature reading on the bulb-type thermometer 42 as the thermometer 10 is translated through a body of liquid, not shown, after a reading has been established on said bulb-type thermometer.

The manner in which the entire thermometer 10 reacts to the imposition of shock and contact loads is one of the factors which results in the material prolongation of the life of said thermometer since the housing 11 thereof serves to shield practically the entire exterior surface of the cell 30 and said cell is isolated almost entirely from direct contact loads which would result in the shattering or cracking of said cell and the leaking of the body 50 therefrom. Furthermore, the provision of the compression spring 34 in the lowermost end of the housing 11 which serves to support the cell 30 in the receptacle 17 also results in the absorption of any considerable vertical shock loads on the exterior of the housing 11 since vertical deflection of the cell 30 against the bias of the compression spring 34 will permit the absorption of excessive shock loads.

It should also be noted at this juncture that the periphery of the cell 30 is maintained in uniform contact with the major portion of the interior walls of the receptable 17, thus preventing substantial lateral movement of the cell itself within said receptacle. However, when the thermometer 10 is subjected to substantial shock loads having a lateral component, the elongated tubular member 38 can deflect within the cell 30 to prevent the shattering of either the cell 30 or said elongated tubular member. When such deflection occurs the lateral movement of the elongated tubular member 38 and, more particularly, the lowermost end thereof will result in momentary contact of the outer ends of the buffers 39 with adjacent portions of the inner wall of the cell 30. Thus, the buffers 39 prevent undue lateral deflection of the elongated tubular member 38 by limiting such deflection and also serve as buffers preventing sudden engagement between large areas of the lowermost end of the elongated tubular member 38 and the interior walls of the cell 30 which might result in the fracture or cracking of either of said components of the thermometer 10.

It is readily apparent, therefore, that by the utilization of a thermometer 10 constructed in accordance with my invention it is possible to obtain relatively accurate readings of a temperature of a portion of a large body of liquid after the thermometer 10 has been immersed in said body of liquid for a relatively short period of time. Furthermore, due to the manner in which the thermometer 10 is constructed, direct contact and shock loads imposed thereupon are absorbed, materially prolonging the life of the thermometer 10 by reducing damage to the components thereof.

It is worthwhile to consider at this time the fact that the provision of the glass fiber wads 47 at the opposite ends of the elongated tubular member 38 also results in the substantial isolation of the bulb-type thermometer 42 from contact with the interior wall of the elongated tubular member 38 and also serves to isolate said thermometer 42 from severe shock loads imposed upon the cell 30 and the elongated tubular member 38.

I have found that the cell 30 and the elongated tubular member 38 constituting an integral portion thereof can best be fabricated by the application of the steps of the method of my invention, since by the use of said steps the cell 30 can be most cheaply and easily manufactured.

Figure 6:
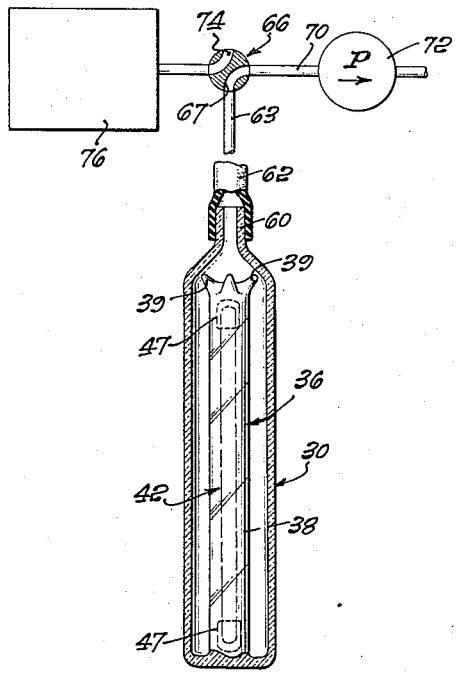
Fig. 6 is a schematic, partly sectional view showing the evacuating step of the method of my invention.
Figure 7:
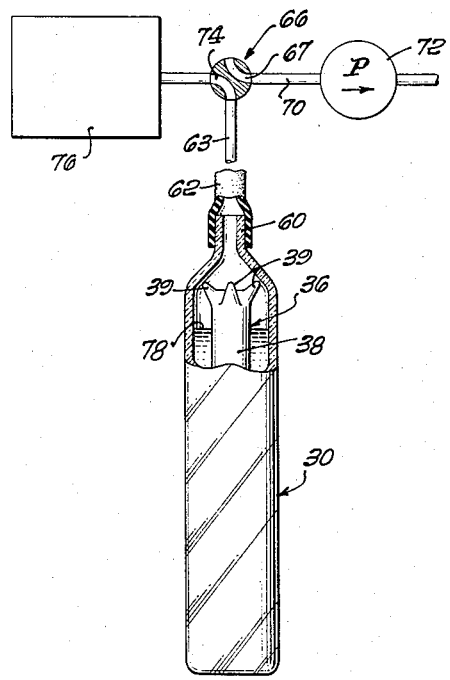
Fig. 7 is a schematic view showing the filling step of the method of my invention.
Figure 8:
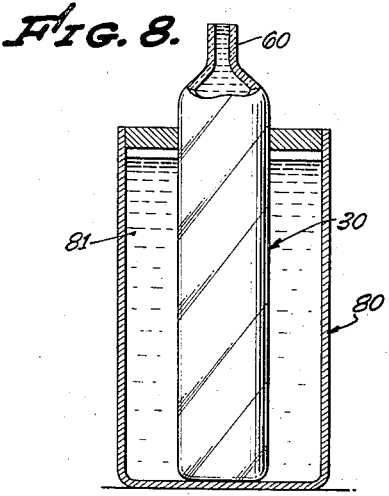
Fig. 8 is a schematic view showing the heating step of the method of my invention.
Figure 9:
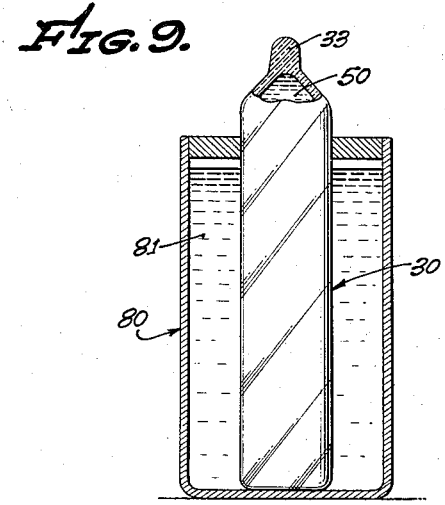
Fig. 9 is a schematic view showing the sealing step of the method of my invention.

After the cell 30 has been blown, molded or otherwise fabricated from the aforementioned heat-resistant glass, which is designed to sustain relatively high temperatures, the lowermost end thereof is permitted to remain open and is provided with a capillary-like neck 60 shown as being of greatly exaggerated diameter in Figs. 6–8 of the drawings for purposes of illustration only. The cell 30 is then inverted into the position shown in Figs. 6–9 of the drawings with the capillary 60 oriented in an upward direction.

With the capillary 60 oriented in the aforesaid upward direction, the end of a flexible tubing 62 is connected thereto, said tubing being, in turn, connected through a line 63 to a valve 66 which is provided with a passage 67 to establish a fluid connection through a line 70 with a vacuum pump 72. After the cell 30 has been connected to the tubing 62, the vacuum pump 72 is energized to draw a vacuum on the interior of the cell 30 and to evacuate the same through the capillary 60. When the cell 30 has been evacuated, the valve 66 is rotated to place a passage 74 thereof in a position such as that shown in Fig. 7 of the drawings to establish liquid communication between the capillary 60 and a reservoir 76 of liquid, such as propylene glycol, which is intended for use as cell liquid.

When the liquid connection between the reservoir 76 and the evacuated cell 30 is accomplished by the aforementioned rotation of the valve 66, the negative pressure area in the interior of the cell 30 causes the aspiration of liquid from the reservoir 76 and the cell 30 is permitted to become partially filled to a level such as that shown at 78 in Fig. 7 of the drawings.

After the cell 30 has been partially filled in the above described manner, it is placed in a heating flask 80 which contains a body 81 of liquid at an elevated temperature. The cell 30 is then subjected to heat at a temperature of approximately 300° to cause the expansion of the liquid within said cell and to drive the excess amount thereof, if any, through the capillary 60 to the exterior of said cell. After the liquid within the cell 30 has reached a stable state at the aforementioned temperature or any other selected temperature, the capillary 60 is sealed off to form the boss 33 provided at the bottom of the cell 30.

Therefore, when the body 50 of the cell liquid returns to the ambient temperature, the space 52 which serves as an expansion space therefor is created. Furthermore, since the cell 30 has been sealed to prevent communication with the ambient air, a negative pressure area is created in the space 52 and thus the body 50 of liquid is characterized by an absence of air bubbles which would materially detract from the effectiveness of the body 50 of cell fluid as both a heat transferring and heat maintaining medium. Furthermore, due to the presence of a negative pressure area in the space 52, the expansion of the cell liquid encountered when the thermometer 11 is suspended in a body of liquid maintained at elevated temperatures can readily take place without the subsequent inclusion in the body 50 of cell liquid of air pockets or bubbles with the undesirable results previously adverted to.

It is, therefore, obvious that I provide by my invention an immersion-type thermometer 10 which is characterized by its ability to maintain a given temperature reading for a relatively prolonged period of time, its resistance to shock and contact loads, and its simplicity of construction. Furthermore, by my invention I also provide a method of fabricating the cell 30 of the thermometer which insures both the presence of an optimum amount of cell liquid in the interior of the cell and the absence of air bubbles or pockets within said liquid, together with the provision of an adequate expansion space.

I claim as my invention:

1. In an immersion thermometer, the combination of: a housing; an elongated, sealed liquid-containing cell mounted in said housing and having an elongated, liquid-containing tubing mounted therein and connected to said cell at one end only; and a bulb-type thermometer mounted in and enclosed by said tubing.

2. In an immersion thermometer, the combination of: a housing; an elongated cell mounted in said housing, said cell having a body of liquid sealed therein; a tubing formed integrally with said cell at one end only and depending therein in spaced relation with the inner wall thereof, the interior of said tubing communicating with the interior of said cell; and a bulb-type thermometer mounted in said tubing.

3. In an immersion thermometer: a housing having an opening in a wall thereof; a transparent cell located in said housing in contiguity to said opening, said cell having a transparent tubing mounted therein in spaced relation with the interior wall thereof and connected to said cell at one end only; and a thermometer supported in and enclosed by said tubing.

4. In an immersion thermometer: a housing having an opening in a wall thereof; a cell located in said housing and having a transparent wall juxtaposed to said opening, said cell having a body of liquid partially filling the same, said cell having mounted therein a transparent tubing in spaced relation with the interior wall thereof, the interior of said tubing communicating with the interior of said cell so as to conduct said liquid between the interiors of said cell and said tubing; and a thermometer supported within said tubing in contact with said liquid and viewable through said opening in said housing.

5. In an immersion thermometer: a housing having an opening in a wall thereof; a cell located in said housing and having a transparent wall juxtaposed to said opening, said cell having a body of liquid partially filling the same and enclosing a transparent tubing depending in said liquid and in spaced relation with the interior wall thereof, said tubing having openings therein for circulating said liquid therethrough; and a thermometer supported within said tubing and viewable through said opening in said housing.

6. In an immersion-type thermometer for ascertaining the temperature of a portion of a large mass of liquid and retaining the indication of said temperature during the transit of said thermometer through said mass, the combination of: an elongated housing having an opening in a wall thereof; a transparent cell disposed in said housing and having an elongated, transparent tubing formed integrally with the interior wall thereof, said cell having a body of liquid sealed therein and surrounding said tubing and said tubing being provided with orifices to facilitate the circulation of said liquid therethrough; and a bulb-type thermometer supported in said tubing and having indicia provided upon the periphery thereof which are perceptible through said opening in said housing.

7. In an immersion-type thermometer, the combination of: a cell enclosing an elongated, tubular supporting member which is disposed in spaced relation with the interior wall of said cell and which is connected to said cell at one end only; and a thermometer disposed within and enclosed by said supporting member in spaced relation with the interior wall thereof.

8. In combination: a cell; an elongated, tubular thermometer support within and spaced from said cell and secured thereto at one end only; an elongated thermometer entirely within and spaced from said support; and shock absorbing means interposed between said thermometer and said support.

9. In combination: a cell; an elongated thermometer support within and spaced from said cell and secured thereto at one end only, whereby the other, free end of said thermometer support may move laterally relative to said cell; interengageable elements on said free end of said thermometer support and said cell for limiting lateral movement of said free end of said thermometer support relative to said cell; and an elongated thermometer carried by said support.

References Cited in the file of this patent

UNITED STATES PATENTS

| | | |
|---|---|---|
| 1,345,347 | Chaney | July 6, 1920 |
| 1,529,176 | Florman | Mar. 10, 1925 |
| 1,838,728 | Anderson | Dec. 29, 1931 |
| 1,876,592 | Beard | Sept. 13, 1932 |
| 1,983,786 | Bandoly | Dec. 11, 1934 |
| 2,065,506 | Billing | Dec. 29, 1936 |
| 2,651,203 | Lamb | Sept. 8, 1953 |
| 2,663,191 | Brown | Dec. 22, 1953 |
| 2,688,876 | Barnes | Sept. 14, 1954 |
| 2,696,937 | Johnson et al. | Dec. 14, 1954 |
| 2,739,480 | LeVan et al. | Mar. 27, 1956 |

FOREIGN PATENTS

| | | |
|---|---|---|
| 7,150 | Great Britain | Feb. 10, 1893 |